Patented May 11, 1926.

1,584,113

UNITED STATES PATENT OFFICE.

WILLIAM E. MALM, OF CLEVELAND, OHIO.

LIBRARY PASTE.

No Drawing.     Application filed May 17, 1920. Serial No. 381,856.

This invention relates to adhesive or library paste. The object of the invention is to provide an improved practically pure white library paste of unctuous or smooth form, which is readily taken up by the brush and is easily spread upon a surface without the necessity of first adding water or making a thinner solution, and therefore avoids the necessity for the usual water well; which retains its moisture for long periods of time and can always be restored to its original consistency by merely placing the open container in a moist atmosphere; which is hygroscopic but nevertheless does not absorb excess moisture from the atmosphere; which has great adhesive power and which can be used on a wide variety of materials; which dries quickly when applied between two surfaces so that after a very short period of time said surfaces cannot be separated except by soaking in water; which is fairly flexible when dried after application and does not dry out so hard as to become brittle with age; which will not freeze at ordinary low or freezing temperatures; and finally a paste of this character which will not ferment or deteriorate upon standing.

Further objects of the invention are in part obvious and in part will appear more in detail hereinafter.

The invention comprises the library paste or adhesive and the process of making the same hereinafter described and claimed.

My improved paste contains both dextrine and glucose, which substances are prepared in the proper manner, hereafter to be described, together with suitable material or re-agents whose function is not only to maintain the paste in a moist condition and unctuous or smooth form but which also is an antiferment or prevents fermentation, decomposition or decay. Other substances may also be added, as will appear.

In preparing the paste the first step is the treatment of the dextrine, which may be any suitable form of dextrine but is preferably what is known as white potato dextrine. This material is mixed with sufficient water to form a thin fluid mass and after smoothing out all lumps is cooked for about fifteen (15) minutes at a temperature below boiling, preferably about 170° to 175° Fahrenheit. This step can be carried out in small quantities in a double boiler and in larger quantities in steam heated vats or kettles. Regulation of the temperature is important because it is found that paste made at temperatures above or below the range specified does not become pure white but has a muddy appearence and does not have the good adhesive qualities of paste made at temperatures within the range specified.

After the mass is sufficiently cooked it is cooled to about one hundred degrees (100°) Fahrenheit and a measured quantity of glucose is added. The glucose may be of any suitable form but is preferably the syrupy or liquid unbleached form of what is known as 43° gravity glucose, (as distinguished from the solid anhydrous glucose known as grape sugar) a comparatively inexpensive product which can be readily obtained in the open market. Equivalents may also be used, such as dextrose in any form. Grape or other sugars or sucrose or even other carbohydrates might be suitable under some circumstances but are usually comparatively expensive, and some of them are objectionable because of the ease with which they crystallize. Also, these other substances cannot be and have not heretofore been used successfully in the rather thick mixtures encountered in the manufacture of library paste. The same is true of glucose, but this substance, when used in thinner form and with the other re-agent employed in my paste is found to be a very satisfactory ingredient with improved results as regards adhesive and other qualities.

The glucose is soluble in the excess water and its solution is greatly facilitated at a temperature of about 100° Fahrenheit. It should also be added after the dextrine has been completely cooked at the higher temperature of about 170° Fahrenheit because experience shows that if the glucose is cooked with the dextrine at such higher temperature some reaction occurs which is detrimental to the best adhesive qualities and the resultant paste is also decidedly darkened in color. The mixture of cooked dextrine and glucose is thoroughly stirred until it is uniform and homogeneous, whereupon the third ingredient is added.

The third ingredient is some substance, such as a salt, base or mixture which is hygroscopic in character and preferably also is antagonistic to fermentation. Pure calcium chloride $CaCl_2$ might be used were it not for its comparatively high cost and the fact that this material crystallizes or throws down too quickly from solution so that when it is used one is likely to discover solid crystals of the $CaCl_2$ in the paste. The best substance so far discovered for the purpose is a commercial form of $CaCl_2$ recovered from the brine or bittern of salt wells after previous extraction of other substances. This material can be purchased in solid form in the open market, its analysis being approximately—

$CaCl_2$ 46%, $MgCl_2$ 19%, NaCl 1%, Insol. .1%, $H_2O$ balance.

This mixture of chlorides is dissolved cold in water in sufficient quantity to form a supersaturated solution. Upon standing eight hours, more or less, a precipitate is thrown down and settles to the bottom, said precipitate containing the excess of chlorides, and probably some hydrates and possibly oxy-chlorides and other insoluble matter. The clear liquid separated by decantation or filtration is a concentrated or saturated solution of the chlorides and this solution, hereafter called solution A, is the one which I prefer to add at approximately 100° Fahrenheit to the mixture of cooked dextrine and glucose.

It is important to add the chloride mixture at the lower temperature of 100° Fahr. If the temperature is raised to 170°–175° the resulting paste does not have the same moisture absorbing or hygroscopic quality exhibited by paste in which the chloride is incorporated at a lower temperature. While the exact reactions are uncertain the poorer quality of the paste made at higher temperature may be due to disassociation of the chloride solution by the hydrolizing action of the water. The hydrolizing effect of the water on the calcium-magnesium chloride also appears to be greatly increased in the presence of dextrine, especially at the higher temperature.

The product is stirred thoroughly, is cooled to room temperature and is allowed to stand for some time, say five (5) hours, until it has congealed or reached a jelly like consistency, whereupon a fourth ingredient is usually added. This material is preferably employed for two reasons, first, to give the final prdouct a pleasant or attractive odor and mask the unpleasant odor of the dextrine, and second, to increase resistance of the paste to fermentation. The material used for this purpose may vary but should contain some essential oils and preferably also some carbolic acid and glycerine, although either or both of the latter may be omitted. One suitable material for the purpose is made up in proportions by volume as follows:

Oil of the white thyme _____ 5
Oil of lemongrass _____ 10
Oil of cassia _____ 20
Carbolic acid _____ 20
Glycerine _____ 20
Proof spirits _____ 15

The chief function of the glycerine and proof spirits is to improve admixture of the oils with each other and promote their thorough distribution in the paste.

When this material has been thoroughly incorporated into the mass by stirring, the product is filled into suitable containers and is allowed to stand in a damp cool place for three weeks or more to age, or it may be subjected to a lower temperature, say 35°–40° F., for a shorter period, or it may be allowed to stand in a mass and filled into the containers after aging.

One definite example of excellent paste was made according to the process before described with materials in proportion as follows;

White potato dextrine 60 grams, water 100 cc., unbleached glucose 40 grams, saturated solution A of chlorides 17 cc., oils, carbolic acid, glycerine and proof spirits .5 cc.

When the paste is first made, that is, before it is aged, its color is not pure white but is somewhat darkened or of a bluish cast. Also, it is comparatively thin or jelly like in consistency. The aging step is advisable because on standing several weeks the paste bleaches out to a practically pure white and becomes more solid. During this period probably some internal molecular change takes place but it is difficult to determine exactly what it may be. However, no matter how long it stands the paste never becomes so stiff that it cannot be readily taken up with the brush. In other words, it does not crust over in the jar but remains of uniform consistency and with a peculiar oily or soapy feeling so that the bristles of the brush readily separate some of the paste from the mass. Even if the jar is allowed to stand uncovered so that the upper surface becomes harder than the material underneath it can be brought back to its original condition by exposing the open jar in a moist atmosphere. In such event the chlorides absorb sufficient moisture from the atmosphere to soften the mass, but as these chlorides were originally incorporated in the paste in concentrated form, they can never absorb more moisture than the paste originaly contained, and the most that the chorides can do is to bring the paste back to its original consistency and no thinner. The chlorides, the carbolic acid and the essential oils are all antagonistic to or tend to prevent fermentation, so that the paste does not become rancid or decomposed on standing. Also, these same materials, to a large extent, will prevent freezing at ordinary freezing temperatures.

While the foregoing describes a method of making library paste of fairly thick or semi-solid form, such as is ordinarily sold in glass jars, the same method may, of course, be used for making a thinner paste for special purposes, in which case it is merely necessary to add the requisite increased amount of water at any stage of the process or even after the paste is completed.

What I claim is:

1. A library paste which with aging becomes white, comprising dextrine and glucose combined with a saturated solution of hygroscopic chlorides.

2. A library paste which with aging becomes white, comprising dextrine and glucose combined with a saturated solution of calcium and magnesium chlorides.

3. The method of making library paste, which with aging becomes white, consisting in cooking dextrine with water at a proper temperature to preserve whiteness of the finished product, cooling the product to a temperature which does not inhibit solution of glucose and which precludes decomposition of a hygroscopic material, and adding a glucose solution and a saturated solution of hygroscopic chlorides.

4. The method of making library paste which with aging becomes white, consisting in cooking dextrine with water at a proper temperature to preserve whiteness of the finished product, cooling the product to a temperature which does not inhibit solution of glucose and which precludes decomposition of a hygroscopic material, and adding a glucose solution and a saturated solution of calcium and magnesium chlorides.

5. The method of making library paste which with aging becomes white, consisting in cooking dextrine with water at approximately 170° Fahrenheit, cooling to about 100° Fahrenheit, adding a glucose solution, and mixing with the product a saturated solution of calcium and magnesium chlorides.

In testimony whereof I affix my signature.

WILLIAM E. MALM.